(12) United States Patent
Peng (10) Patent No.: US 11,754,810 B2
(45) Date of Patent: Sep. 12, 2023

(54) CAMERA OPTICAL LENS

(71) Applicant: AAC Optics (Changzhou) Co., Ltd., Changzhou (CN)

(72) Inventor: Haichao Peng, Shenzhen (CN)

(73) Assignee: AAC Optics (Changzhou) Co., Ltd., Changzhou (CN)

( * ) Notice: Subject to any disclaimer, the term of this patent is extended or adjusted under 35 U.S.C. 154(b) by 483 days.

(21) Appl. No.: 17/133,676

(22) Filed: Dec. 24, 2020

(65) Prior Publication Data
US 2022/0011549 A1    Jan. 13, 2022

(30) Foreign Application Priority Data

Jul. 13, 2020  (CN) .......................... 202010666184.0

(51) Int. Cl.
| | | |
|---|---|---|
| *G02B 13/00* | (2006.01) | |
| *G02B 9/64* | (2006.01) | |
| *G02B 13/04* | (2006.01) | |
| *G02B 13/06* | (2006.01) | |

(52) U.S. Cl.
CPC ........... *G02B 13/0045* (2013.01); *G02B 9/64* (2013.01); *G02B 13/04* (2013.01); *G02B 13/06* (2013.01)

(58) Field of Classification Search
CPC ...... G02B 13/0045; G02B 9/64; G02B 13/04; G02B 13/06; G02B 13/18; G02B 9/14; G02B 15/143105; G02B 15/144105
See application file for complete search history.

(56) References Cited

FOREIGN PATENT DOCUMENTS

| | | | | | |
|---|---|---|---|---|---|
| CN | 105589176 A | * | 5/2016 | ......... | G02B 13/0045 |
| CN | 111722365 A | * | 9/2020 | ......... | G02B 13/0045 |
| EP | 2860564 A1 | * | 4/2015 | ......... | G02B 13/0045 |
| JP | 6377831 B1 | * | 8/2018 | ......... | G02B 13/0045 |
| WO | WO-2019080554 A1 | * | 5/2019 | ......... | G02B 13/0045 |

* cited by examiner

*Primary Examiner* — William Choi
*Assistant Examiner* — Ray Alexander Dean
(74) *Attorney, Agent, or Firm* — W&G Law Group (57) ABSTRACT

A camera optical lens includes, from an object side to an image side, a first lens having positive refractive power, a second lens having negative refractive power, a third lens having positive refractive power, a fourth lens having negative refractive power, a fifth lens having refractive power, a sixth lens having positive refractive power, and a seventh lens having negative refractive power. The camera optical lens satisfies: $2.90 \leq v1/v2 \leq 4.50$; $4.00 \leq f3/f \leq 10.00$; $1.50 \leq d1/d2 \leq 4.00$; and $3.00 \leq R7/R8$. The camera optical lens has good optical performance while meeting the design requirements of a large aperture, a wide angle, and ultra-thinness.

10 Claims, 7 Drawing Sheets

CAMERA OPTICAL LENS

TECHNICAL FIELD

The present invention relates to the field of optical lenses, and more particularly, to a camera optical lens suitable for portable terminal devices such as smart phones and digital cameras, as well as camera devices such as monitors and PC lenses.

BACKGROUND

In recent years, with the popularity of smart phones, the demand for a miniaturized camera lens has increased. The photosensitive devices of a conventional camera lens are nothing more than charge coupled devices (CCD) or complementary metal-oxide semiconductor devices (CMOS Sensor). With the advancement of semiconductor manufacturing technology, the pixel size of the photosensitive device has become smaller and smaller, and nowadays electronic products are developing with good functions and thin and small appearance. Therefore, the miniaturized camera lens with good imaging quality has become the mainstream in the current market.

In order to obtain a better imaging quality, the camera lens traditionally mounted onto a mobile phone camera mostly adopts a structure including three lenses or four lenses. However, with the development of technology and increased diversified requirements from the users, in the situation where a pixel area of a photosensitive device gradually decreases and the requirement in the imaging quality gradually increases, a camera lens having a five-lens, or six-lens, or seven-lens structure has gradually appeared in lens design. Although the conventional camera lens including seven lenses already has good optical performance, there is still some irrationality in terms of focal power, a distance between lenses and shapes of the respective lenses. As a result, the lens structure cannot meet the design requirements of a large aperture, a wide angle and ultra-thinness while having good optical performance.

SUMMARY

In view of the above-mentioned problems, a purpose of the present invention is to provide a camera optical lens, which not only has good optical performance, but also meets the design requirements of a large aperture, a wide angle and ultra-thinness.

In order to solve the above-mentioned technical problems, an embodiment of the present invention provides a camera optical lens, including, from an object side to an image side, a first lens having a positive refractive power, a second lens having a negative refractive power, a third lens having a positive refractive power, a fourth lens having a negative refractive power, a fifth lens having a refractive power, a sixth lens having a positive refractive power, and a seventh lens having a negative refractive power. The camera optical lens satisfies following conditions: $2.90 \leq v1/v2 \leq 4.50$; $4.00 \leq f3/f \leq 10.00$; $1.50 \leq d1/d2 \leq 4.00$; and $3.00 \leq R7/R8$, where f denotes a focal length of the camera optical lens, f3 denotes a focal length of the third lens, v1 denotes an abbe number of the first lens, v2 denotes an abbe number of the second lens, R7 denotes a curvature radius of an object side surface of the fourth lens, R8 denotes a curvature radius of an image side surface of the fourth lens, d1 denotes an on-axis thickness of the first lens, and d2 denotes an on-axis distance from an image side surface of the first lens to an object side surface of the second lens.

In an improved embodiment, the camera optical lens further satisfies a following condition: $-15.00 \leq (R5+R6)/(R5-R6) \leq -1.50$, where R5 denotes a curvature radius of an object side surface of the third lens, and R6 denotes a curvature radius of an image side surface of the third lens.

In an improved embodiment, the camera optical lens further satisfies following conditions: $0.45 \leq f1/f \leq 1.56$; $-4.24 \leq (R1+R2)/(R1-R2) \leq -1.13$; and $0.05 \leq d1/TTL \leq 0.21$, where f1 denotes a focal length of the first lens, R1 denotes a curvature radius of an object side surface of the first lens, R2 denotes a curvature radius of the image side surface of the first lens, and TTL denotes a total optical length from the object side surface of the first lens to an image plane of the camera optical lens along an optic axis.

In an improved embodiment, the camera optical lens further satisfies following conditions: $-10.30 \leq f2/f \leq -1.64$; $0.80 \leq (R3+R4)/(R3-R4) \leq 8.33$; and $0.02 \leq d3/TTL \leq 0.08$, where f2 denotes a focal length of the second lens, R3 denotes a curvature radius of the object side surface of the second lens, R4 denotes a curvature radius of an image side surface of the second lens, d3 denotes an on-axis thickness of the second lens, and TTL denotes a total optical length from an object side surface of the first lens to an image plane of the camera optical lens along an optic axis.

In an improved embodiment, the camera optical lens further satisfies a following condition: $0.02 \leq d5/TTL \leq 0.08$, where d5 denotes an on-axis thickness of the third lens, and TTL denotes a total optical length from an object side surface of the first lens to an image plane of the camera optical lens along an optic axis.

In an improved embodiment, the camera optical lens further satisfies following conditions: $-9.30 \leq f4/f \leq -2.57$; $0.50 \leq (R7+R8)/(R7-R8) \leq 2.99$; and $0.03 \leq d7/TTL \leq 0.09$, where f4 denotes a focal length of the fourth lens, d7 denotes an on-axis thickness of the fourth lens, and TTL denotes a total optical length from an object side surface of the first lens to an image plane of the camera optical lens along an optic axis.

In an improved embodiment, the camera optical lens further satisfies following conditions: $-116.94 \leq f5/f \leq 19.63$; $-4.32 \leq (R9+R10)/(R9-R10) \leq 21.95$; and $0.03 \leq d9/TTL \leq 0.12$, where f5 denotes a focal length of the fifth lens, R9 denotes a curvature radius of an object side surface of the fifth lens, R10 denotes a curvature radius of an image side surface of the fifth lens, d9 denotes an on-axis thickness of the fifth lens, and TTL denotes a total optical length from an object side surface of the first lens to an image plane of the camera optical lens along an optic axis.

In an improved embodiment, the camera optical lens further satisfies following conditions: $0.53 \leq f6/f \leq 1.97$; $-4.32 \leq (R11+R12)/(R11-R12) \leq -1.17$; and $0.04 \leq d11/TTL \leq 0.17$, where f6 denotes a focal length of the sixth lens, R11 denotes a curvature radius of an object side surface of the sixth lens, R12 denotes a curvature radius of an image side surface of the sixth lens, d11 denotes an on-axis thickness of the sixth lens, and TTL denotes a total optical length from an object side surface of the first lens to an image plane of the camera optical lens along an optic axis.

In an improved embodiment, the camera optical lens further satisfies following conditions: $-1.49 \leq f7/f \leq -0.47$; $-0.61 \leq (R13+R14)/(R13-R14) \leq 0.21$; and $0.03 \leq d13/TTL \leq 0.11$, where f7 denotes a focal length of the seventh lens, R13 denotes a curvature radius of an object side surface of the seventh lens, R14 denotes a curvature radius of an image side surface of the seventh lens, d13 denotes an on-axis thickness of the seventh lens, and TTL denotes a total optical length from an object side surface of the first lens to an image plane of the camera optical lens along an optic axis.

In an improved embodiment, the first lens is made of a glass material.

The present invention at least have the following beneficial effects. The camera optical lens according to the present invention has good optical performance and further has characteristics of a large aperture, a wide angle and ultra-thinness, and is especially suitable for the mobile phone camera lens assembly and the WEB camera lens composed of imaging elements such as CCD and CMOS for high pixels.

BRIEF DESCRIPTION OF DRAWINGS

In order to more clearly illustrate technical solutions in embodiments of the present invention, the accompanying drawings used in the embodiments are briefly introduced as follows. It should be noted that the drawings described as follows are merely part of the embodiments of the present invention, and other drawings can also be acquired by those skilled in the art without paying creative efforts.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figures and the embodiments. It should be understood the specific embodiments described hereby is only to explain the invention, not intended to limit the invention.

Embodiment 1

Figure 1:
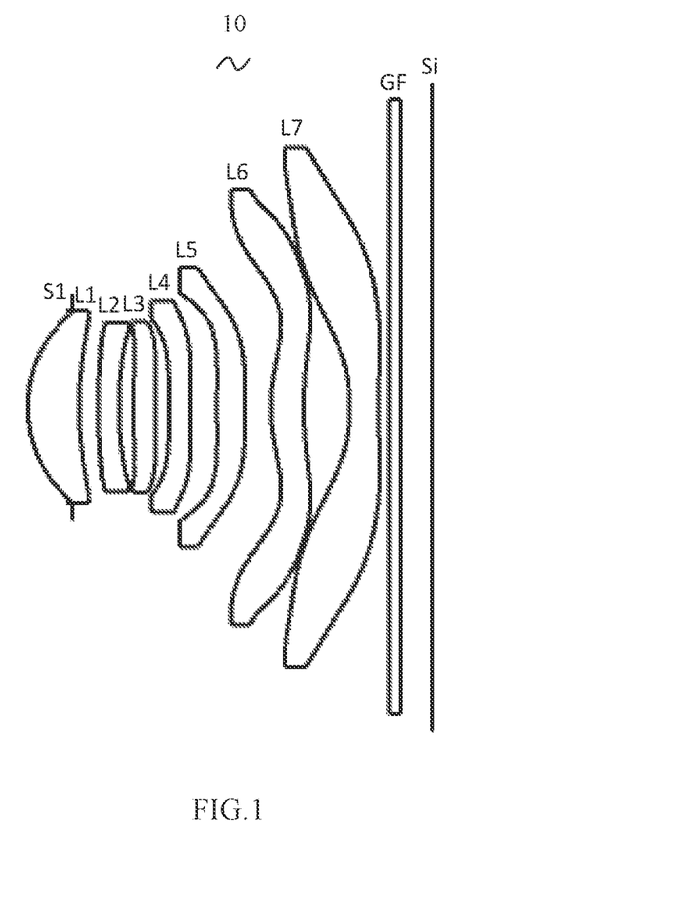
FIG. 1 is a schematic structural diagram of a camera optical lens according to Embodiment 1.

With reference to the accompanying drawings, the present invention provides a camera optical lens 10. FIG. 1 shows a camera optical lens 10 according to Embodiment 1 of the present invention. The camera optical lens 10 includes seven lenses. Specifically, the camera optical lens 10 includes, from an object side to an image side, an aperture S1, a first lens L1, a second lens L2, a third lens L3, a fourth lens L4, a fifth lens L5, a sixth lens L6, and a seventh lens L7. Optical elements such as an optical filter GF may be provided between the seventh lens L7 and an image plane Si.

In this embodiment, the first lens L1 has a positive refractive power, the second lens L2 has a negative refractive power, the third lens L3 has a positive refractive power, the fourth lens L4 has a negative refractive power, the fifth lens L5 has a positive refractive power, the sixth lens L6 has a positive refractive power, and the seventh lens L7 has a negative refractive power.

In this embodiment, the first lens L1 is made of a glass material, the second lens L2 is made of a glass material, the third lens L3 is made of a glass material, the fourth lens L4 is made of a glass material, the fifth lens L5 is made of a glass material, the sixth lens L6 is made of a glass material, and the seventh lens L7 is made of a plastic material. In other embodiments, the first lens L1, the second lens L2, the third lens L3, the fourth lens L4, the fifth lens L5, the sixth lens L6, and the seventh lens L7 may also be made of other materials, which will not be limited herein.

In this embodiment, it is defined that an abbe number of the first lens L1 is denoted by v1, an abbe number of the second lens is denoted by v2, and the camera optical lens satisfies the following condition: $2.90 \leq v1/v2 \leq 4.50$, which specifies a ratio of a dispersion coefficient of the first lens to a dispersion coefficient of the second lens. Within a range defined by this condition, it is beneficial to improve the performance of the optical system.

It is defined that a focal length of the camera optical lens 10 is denoted by f, a focal length of the third lens L3 is denoted by f3, and the camera optical lens further satisfies the following condition: $4.00 \leq f3/f \leq 10.00$, which specifies a ratio of the focal length of the third lens to the focal length of the camera optical lens. Reasonable allocation of focal length enables the system to have better imaging quality and lower sensitivity.

It is defined that an on-axis thickness of the first lens L1 is denoted by d1, an on-axis distance from an image side surface of the first lens L1 to an object side surface of the second lens L2 is denoted by d2, and the camera optical lens further satisfies the following condition: $1.50 \leq d1/d2 \leq 4.00$, which specifies a ratio of the on-axis thickness of the first lens to the on-axis distance from the image side surface of the first lens to the object side surface of the second lens. Within a range defined by this condition, it is beneficial to reduce the total optical length and achieve ultra-thinness.

It is defined that a curvature radius of an object side surface of the fourth lens L4 is denoted by R7, a curvature radius of an image side surface of the fourth lens L4 is denoted by R8, and the camera optical lens further satisfies the following condition: $3.00 \leq R7/R8$, which specifies a shape of the fourth lens. Within a range defined by this condition, with the development of ultra-thinness and wide-angle, it is beneficial to correct off-axis aberration.

It is defined that a curvature radius of an object side surface of the third lens L3 is denoted by R5, a curvature radius of an image side surface of the third lens L3 is denoted by R6, and the camera optical lens further satisfies the following condition: $-15.00 \leq (R5+R6)/(R5-R6) \leq -1.50$, which specifies a shape of the third lens. Within a range defined by this condition, it is beneficial to alleviate a degree of deflection of light passing through the lens and effectively reduce aberration.

In this embodiment, the object side surface of the first lens L1 is a convex surface at a paraxial position, and the image side surface of the first lens L1 is a concave surface at a paraxial position.

It is defined that the focal length of the camera optical lens 10 is denoted by f, a focal length of the first lens L1 is denoted by f1, and the camera optical lens further satisfies the following condition: $0.45 \leq f1/f \leq 1.56$, which specifies a ratio of the focal length of the first lens L1 to the focal length of the camera optical lens. Within a range defined by this condition, the first lens has an appropriate positive refractive power, which is beneficial to reduce aberration of the system, and is beneficial to achieve ultra-thinness and a wide angle of the lens. As an example, the camera optical lens further satisfies the following condition: $0.72 \leq f1/f \leq 1.24$.

A curvature radius of an object side surface of the first lens L1 is denoted by R1, a curvature radius of an image side surface of the first lens L1 is denoted by R2, and the camera optical lens further satisfies the following condition: $-4.24 \leq (R1+R2)/(R1-R2) \leq -1.13$. By reasonably controlling a shape of the first lens L1, the first lens L1 can effectively correct spherical aberration of the system. As an example, the camera optical lens further satisfies the following condition: $-2.65 \leq (R1+R2)/(R1-R2) \leq -1.42$.

An axial thickness of the first lens L1 is denoted by d1, a total optical length from the object side surface of the first lens to the image plane of the camera optical lens 10 along an optic axis is TTL, and the camera optical lens further satisfies the following condition: $0.05 \leq d1/TTL \leq 0.21$. Within a range defined by this condition, it is beneficial to achieve ultra-thinness. As an example, the camera optical lens further satisfies the following condition: $0.08 \leq d1/TTL \leq 0.17$.

In this embodiment, the object side surface of the second lens L2 is a convex surface at a paraxial position, and the image side surface of the second lens L2 is a concave surface at a paraxial position.

It is defined that the focal length of the camera optical lens 10 is denoted by f, a focal length of the second lens L2 is denoted by f2, and the camera optical lens further satisfies the following condition: $-10.30 \leq f2/f \leq -1.64$. By controlling the negative focal power of the second lens L2 within a reasonable range, it is beneficial to correct aberration of the optical system. As an example, the camera optical lens further satisfies the following condition: $-6.44 \leq f2/f \leq -2.04$.

A curvature radius of an object side surface of the second lens L2 is denoted by R3, a curvature radius of an image side surface of the second lens L2 is denoted by R4, and the camera optical lens further satisfies the following condition: $0.80 \leq (R3+R4)/(R3-R4) \leq 8.33$, which specifies a shape of the second lens L2. Within a range defined by this condition, with the development of ultra-thinness and wide angle of the camera optical lens, it is beneficial to correct the longitudinal aberration. As an example, the camera optical lens further satisfies the following condition: $1.27 \leq (R3+R4)/(R3-R4) \leq 6.66$.

An axial thickness of the second lens L2 is denoted by d3, the total optical length from the object side surface of the first lens to the image plane of the camera optical lens 10 along the optic axis is TTL, and the camera optical lens further satisfies the following condition: $0.02 \leq d3/TTL \leq 0.08$. Within a range defined by this condition, it is beneficial to achieve ultra-thinness. As an example, the camera optical lens further satisfies the following condition: $0.03 \leq d3/TTL \leq 0.06$.

In this embodiment, the object side surface of the third lens L3 is a convex surface at a paraxial position, and the image side surface of the third lens L3 is a concave surface at a paraxial position.

It is defined that an on-axis thickness of the third lens L3 is denoted by d5, the total optical length from the object side surface of the first lens to the image plane of the camera optical lens 10 along the optic axis is TTL, and the camera optical lens further satisfies the following condition: $0.02 \leq d5/TTL \leq 0.08$. Within a range defined by this condition, it is beneficial to achieve ultra-thinness. As an example, the camera optical lens further satisfies the following condition: $0.03 \leq d5/TTL \leq 0.06$.

In this embodiment, the object side surface of the fourth lens L4 is a convex surface at a paraxial position, and the image side surface of the fourth lens L4 is a concave surface at a paraxial position.

It is defined that the focal length of the camera optical lens 10 is denoted by f, a focal length of the fourth lens L4 is denoted by f4, and the camera optical lens further satisfies the following condition: $-9.30 \leq f4/f \leq -2.57$, which specifies a ratio of the focal length of the fourth lens to the focal length of the camera optical lens. Within a range defined by this condition, it is beneficial to improve the performance of the optical system. As an example, the camera optical lens further satisfies the following condition: $-5.81 \leq f4/f \leq -3.21$.

A curvature radius of an object side surface of the fourth lens L4 is denoted by R7, a curvature radius of an image side surface of the fourth lens L4 is denoted by R8, and the camera optical lens further satisfies the following condition: $0.50 \leq (R7+R8)/(R7-R8) \leq 2.99$, which specifies a shape of the fourth lens L4. Within a range defined by this condition, with the development of ultra-thinness and wide angle, it is beneficial to correct off-axis aberration. As an example, the camera optical lens further satisfies the following condition: $0.80 \leq (R7+R8)/(R7-R8) \leq 2.39$.

An on-axis thickness of the fourth lens L4 is denoted by d7, the total optical length from the object side surface of the first lens to the image plane of the camera optical lens 10 along the optic axis is denoted by TTL, and the camera optical lens further satisfies the following condition: $0.03 \leq d7/TTL \leq 0.09$. Within a range defined by this condition, it is beneficial to achieve ultra-thinness. As an example, the camera optical lens further satisfies the following condition: $0.04 \leq d7/TTL \leq 0.07$.

In this embodiment, the object side surface of the fifth lens L5 is a convex surface at a paraxial position, and the image side surface of the fifth lens L5 is a concave surface at a paraxial position.

It is defined that the focal length of the camera optical lens 10 is denoted by f, and a focal length of the fifth lens L5 is denoted by f5, then the camera optical lens further satisfies the following condition: $-116.94 \leq f5/f \leq 19.63$. The limitation on the fifth lens L5 can effectively smooth a light angle of the camera lens and reduce tolerance sensitivity. As an example, the camera optical lens further satisfies the following condition: $-73.09 \leq f5/f \leq 15.71$.

A curvature radius of an object side surface of the fifth lens L5 is denoted by R9, a curvature radius of an image side surface of the fifth lens L5 is denoted by R10, and the camera optical lens further satisfies the following condition: $-4.32 \leq (R9+R10)/(R9-R10) \leq 21.95$, which specifies a shape of the fifth lens L5. Within a range defined by this condition, with the development of ultra-thinness and wide angle, it is beneficial to correct off-axis aberration. As an example, the camera optical lens further satisfies the following condition: $-2.70 \leq (R9+R10)/(R9-R10) \leq 17.56$.

An on-axis thickness of the fifth lens L5 is denoted by d9, the total optical length from the object side surface of the first lens to the image plane of the camera optical lens 10 along the optic axis is denoted by TTL, and the camera optical lens further satisfies the following condition: $0.03 \leq d9/TTL \leq 0.12$. Within a range defined by this condition, it is beneficial to achieve ultra-thinness. As an example, the camera optical lens further satisfies the following condition: $0.05 \leq d9/TTL \leq 0.10$.

In this embodiment, the object side surface of the sixth lens L6 is a convex surface at a paraxial position, and the image side surface of the sixth lens L6 is a concave surface at a paraxial position.

It is defined that a total focal length of the camera optical lens 10 is denoted by f, a focal length of the sixth lens L6 is denoted by f6, and the camera optical lens further satisfies the following condition: $0.53 \leq f6/f \leq 1.97$. Reasonable distribution of focal power enables the system to have better imaging quality and lower sensitivity. As an example, the camera optical lens further satisfies the following condition: $0.85 \leq f6/f \leq 1.58$.

A curvature radius of an object side surface of the sixth lens L6 is denoted by R11, a curvature radius of an image side surface of the sixth lens L6 is denoted by R12, and the camera optical lens further satisfies the following condition: $-4.32 \leq (R11+R12)/(R11-R12) \leq -1.17$, which specifies a shape of the sixth lens L6. Within a range defined by this condition, with the development of ultra-thinness and wide angle, it is beneficial to correct off-axis aberration. As an example, the camera optical lens further satisfies the following condition: $-2.70 \leq (R11+R12)/(R11-R12) \leq -1.47$.

An on-axis thickness of the sixth lens L6 is denoted by d11, the total optical length from the object side surface of the first lens to the image plane of the camera optical lens 10 along the optic axis is denoted by TTL, and the camera optical lens further satisfies the following condition: $0.04 \leq d11/TTL \leq 0.17$. Within a range defined by this condition, it is beneficial to achieve ultra-thinness. As an example, the camera optical lens further satisfies the following condition: $0.07 \leq d11/TTL \leq 0.13$.

In this embodiment, an object side surface of the seventh lens L7 is a concave surface at a paraxial position, and an image side surface of the seventh lens L7 is a concave surface at a paraxial position.

It is defined that a total focal length of the camera optical lens 10 is denoted by f, a focal length of the seventh lens L7 is denoted by f7, and the camera optical lens further satisfies the following condition: $-1.49 \leq f7/f \leq -0.47$. Within a range defined by this condition, the reasonable allocation of focal power enables the system to have better imaging quality and lower sensitivity. As an example, the camera optical lens further satisfies the following condition: $-0.93 \leq f7/f \leq -0.58$.

A curvature radius of the object side surface of the seventh lens L7 is R13, and a curvature radius of the image side surface of the seventh lens L7 is R14, and the camera optical lens further satisfies the following condition: $-0.61 \leq (R13+R14)/(R13-R14) \leq 0.21$, which specifies a shape of the seventh lens L7. Within a range defined by this condition, with the development of ultra-thinness and wide angle, it is beneficial to correct off-axis aberration. As an example, the camera optical lens further satisfies the following condition: $-0.38 \leq (R13+R14)/(R13-R14) \leq 0.16$.

An on-axis thickness of the seventh lens L7 is d13, the total optical length from the object side surface of the first lens to the image plane of the camera optical lens 10 along the optic axis is denoted by TTL, and the camera optical lens further satisfies the following condition: $0.03 \leq d13/TTL \leq 0.11$. Within a range defined by this condition, it is beneficial to achieve ultra-thinness. As an example, the camera optical lens further satisfies the following condition: $0.05 \leq d13/TTL \leq 0.08$.

In this embodiment, the image height of the camera optical lens 10 is IH, the total optical length from the object side surface of the first lens to the image plane of the camera optical lens 10 along an optic axis is denoted by TTL, and the camera optical lens further satisfies the following condition: $TTL/IH \leq 1.32$, which is beneficial to achieve ultra-thinness.

In this embodiment, the field of view (FOV) of the camera optical lens 10 is greater than or equal to 81°, so as to achieve a wide angle.

In this embodiment, an F number (FNO) of the camera optical lens 10 is smaller than or equal to 1.90, so as to achieve a large aperture and excellent imaging performance of the camera optical lens.

In this embodiment, a total focal length of the camera optical lens 10 is denoted by f, a combined focal length of the first lens L1 and the second lens L2 is denoted by f12, and the camera optical lens further satisfies the following condition: $0.59 \leq f12/f \leq 1.87$. Within a range defined by this condition, aberration and distortion of the camera optical lens 10 can be eliminated, and a back focal length of the camera optical lens 10 can be reduced to maintain miniaturization of the camera optical lens system. As an example, the camera optical lens further satisfies the following condition: $0.95 \leq f12/f \leq 1.50$.

When the above-mentioned conditions are satisfied, the camera optical lens 10 can meet the design requirements of a large aperture, a wide angle and ultra-thinness while having good optical performance. According to the characteristics of the camera optical lens 10, the camera optical lens 10 is especially suitable for the mobile phone camera lens assembly and the WEB camera lens composed of imaging elements such as CCD and CMOS for high pixels.

The following description will illustrate the camera optical lens 10 of the present invention with examples. The symbols described in each example are as follows. The focal length, the on-axis distance, the curvature radius, the on-axis thickness, the inflection point position, and the stagnation point position are all expressed in unit of mm.

TTL: a total optical length (an on-axis distance from an object side surface of the first lens L1 to an image plane along an optic axis), in unit of mm.

FNO: an F number (a ratio of an effective focal length of the camera optical lens to an entrance pupil diameter).

As an example, the object side surface and/or the image side surface of the lens may be provided with an inflection point and/or a stagnation point, so as to meet requirements of high imaging quality. For detailed implementation manners, please refer to the following description.

Table 1 and Table 2 show design data of the camera optical lens 10 according to Embodiment 1 of the present invention.

TABLE 1

|  | R |  | d | nd |  | vd |
|---|---|---|---|---|---|---|
| S1 | ∞ | d0= | −0.780 |  |  |  |
| R1 | 2.260 | d1= | 0.902 | nd1 | 1.5267 v1 | 76.61 |
| R2 | 6.322 | d2= | 0.331 |  |  |  |
| R3 | 9.188 | d3= | 0.366 | nd2 | 1.6700 v2 | 19.39 |
| R4 | 5.973 | d4= | 0.247 |  |  |  |
| R5 | 12.036 | d5= | 0.383 | nd3 | 1.5444 v3 | 55.82 |
| R6 | 27.992 | d6= | 0.241 |  |  |  |

TABLE 1-continued

| | R | d | | nd | | vd |
|---|---|---|---|---|---|---|
| R7 | 101.541 | d7= | 0.375 | nd4 | 1.6700 v4 | 19.39 |
| R8 | 16.111 | d8= | 0.465 | | | |
| R9 | 24.425 | d9= | 0.496 | nd5 | 1.5661 v5 | 37.71 |
| R10 | 66.484 | d10= | 0.445 | | | |
| R11 | 2.889 | d11= | 0.580 | nd6 | 1.5346 v6 | 55.69 |
| R12 | 7.879 | d12= | 0.799 | | | |
| R13 | −3.771 | d13= | 0.500 | nd7 | 1.5346 v7 | 55.69 |
| R14 | 7.084 | d14= | 0.188 | | | |
| R15 | ∞ | d15= | 0.210 | ndg | 1.5168 vg | 64.17 |
| R16 | ∞ | d16= | 0.556 | | | |

The symbols in the above table are defined as follows.
S1: aperture;
R: curvature radius at a center of an optical surface
R1: curvature radius of an object side surface of a first lens L1;
R2: curvature radius of an image side surface of the first lens L1;
R3: curvature radius of an object side surface of a second lens L2;
R4: curvature radius of an image side surface of the second lens L2;
R5: curvature radius of an object side surface of a third lens L3;
R6: curvature radius of an image side surface of the third lens L3;
R7: curvature radius of an object side surface of a fourth lens L4;
R8: curvature radius of an image side surface of the fourth lens L4;
R9: curvature radius of an object side surface of a fifth lens L5;
R10: curvature radius of an image side surface of the fifth lens L5;
R11: curvature radius of an object side surface of a sixth lens L6;
R12: curvature radius of an image side surface of the sixth lens L6;
R13: curvature radius of an object side surface of a seventh lens L7;
R14: curvature radius of an image side surface of the seventh lens L7;
R15: curvature radius of an object side surface of an optical filter GF;
R16: curvature radius of an image side surface of the optical filter GF;
d: on-axis thickness of a lens, on-axis distance between adjacent lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the sixth lens L6 to the object side surface of the seventh lens L7;
d13: on-axis thickness of the seventh lens L7;
d14: on-axis distance from the image side surface of the seventh lens L7 to the object side surface of the optical filter GF;
d15: on-axis thickness of the optical filter GF;
d16: on-axis distance from the image side surface of the optical filter GF to an image plane;
nd: refractive index of d-line;
nd1: refractive index of d-line of the first lens L1;
nd2: refractive index of d-line of the second lens L2;
nd3: refractive index of d-line of the third lens L3;
nd4: refractive index of d-line of the fourth lens L4;
nd5: refractive index of d-line of the fifth lens L5;
nd6: refractive index of d-line of the sixth lens L6;
nd7: refractive index of d-line of the seventh lens L7;
ndg: refractive index of d-line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the optical filter GF.

Table 2 shows aspherical surface data of the respective lenses in the camera optical lens 10 according to Embodiment 1 of the present invention.

TABLE 2

| | Cone coefficient | Aspherical coefficient | | | | |
|---|---|---|---|---|---|---|
| | k | A4 | A6 | A8 | A10 | A12 |
| R1 | −2.2519E−01 | 2.2300E−03 | 2.0750E−03 | −3.1607E−03 | 4.3908E−03 | −3.7673E−03 |
| R2 | −2.7365E+01 | 9.4424E−03 | −3.7548E−03 | 3.4235E−04 | 6.1515E−04 | −4.0698E−04 |
| R3 | 2.6066E+01 | −1.8793E−02 | 5.1095E−03 | −5.4961E−03 | 9.4254E−03 | −8.5211E−03 |
| R4 | −2.6207E+01 | 5.0186E−03 | −2.0971E−04 | 2.4860E−03 | −3.2386E−03 | 8.2772E−03 |
| R5 | −9.9900E+01 | −3.2057E−03 | −6.8072E−03 | −3.0679E−03 | 2.6908E−03 | −1.1292E−03 |
| R6 | −5.4432E+01 | −1.5732E−02 | −1.2816E−03 | 5.7804E−03 | −2.3507E−02 | 2.9337E−02 |
| R7 | 9.9900E+01 | −5.5523E−02 | 1.5614E−02 | −1.8516E−02 | 2.0771E−02 | −2.0774E−02 |
| R8 | −9.9990E+01 | −4.7997E−02 | 1.4213E−02 | −9.4606E−03 | 3.9069E−03 | −2.5812E−04 |
| R9 | 1.4710E+01 | −4.4024E−02 | 2.1976E−02 | −1.7359E−02 | 8.0828E−03 | −2.3367E−03 |
| R10 | 9.9900E+01 | −7.9753E−02 | 4.0326E−02 | −2.3476E−02 | 1.1341E−02 | −4.0846E−03 |
| R11 | −6.9434E+00 | −1.4162E−02 | −3.5243E−03 | −1.0664E−03 | 6.3098E−04 | −1.1296E−04 |
| R12 | 2.7061E+00 | 1.2110E−02 | −1.3817E−02 | 2.9597E−03 | −2.6928E−04 | −1.9292E−06 |

TABLE 2-continued

| | | | | | |
|---|---|---|---|---|---|
| R13 | −5.8600E−01 | −3.9527E−02 | 1.8679E−02 | −3.9709E−03 | 5.5007E−04 | −5.1487E−05 |
| R14 | −6.0006E+01 | −3.1252E−02 | 9.0883E−03 | −1.7475E−03 | 2.1966E−04 | −1.8623E−05 |

| | Cone coefficient | Aspherical coefficient | | | |
|---|---|---|---|---|---|
| | k | A14 | A16 | A18 | A20 |
| R1 | −2.2519E−01 | 2.0495E−03 | −6.8751E−04 | 1.2981E−04 | −1.0746E−05 |
| R2 | −2.7365E+01 | −7.9060E−06 | 8.8310E−05 | −3.1621E−05 | 3.4032E−06 |
| R3 | 2.6066E+01 | 4.6759E−03 | −1.5176E−03 | 2.6775E−04 | −1.9844E−05 |
| R4 | −2.6207E+01 | −9.2913E−03 | 5.6774E−03 | −1.8073E−03 | 2.4325E−04 |
| R5 | −9.9900E+01 | −3.9033E−04 | 6.7965E−04 | −2.6328E−04 | 3.6206E−05 |
| R6 | −5.4432E+01 | −2.0634E−02 | 8.3132E−03 | −1.7224E−03 | 1.3523E−04 |
| R7 | 9.9900E+01 | 1.4516E−02 | −6.6220E−03 | 1.7948E−03 | −2.1638E−04 |
| R8 | −9.9990E+01 | −7.2876E−04 | 4.3386E−04 | −1.0328E−04 | 9.1213E−06 |
| R9 | 1.4710E+01 | 1.4056E−04 | 1.3114E−04 | −3.8438E−05 | 3.3746E−06 |
| R10 | 9.9900E+01 | 9.7829E−04 | −1.4079E−04 | 1.0901E−05 | −3.4915E−07 |
| R11 | −6.9434E+00 | 1.0876E−05 | −6.1659E−07 | 1.9563E−08 | −2.6949E−10 |
| R12 | 2.7061E+00 | 3.0210E−06 | −3.0915E−07 | 1.3848E−08 | −2.3937E−10 |
| R13 | −5.8600E−01 | 3.1894E−06 | −1.2442E−07 | 2.7572E−09 | −2.6393E−11 |
| R14 | −6.0006E+01 | 1.0524E−06 | −3.7470E−08 | 7.5057E−10 | −6.3837E−12 |

Herein, k represents a cone coefficient, and A4, A6, A8, A10, A12, A14, A16, A18, and A20 represents aspherical coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

In the equation (1), x represents a vertical distance between a point on an aspherical curve and an optic axis, and y represents an aspherical depth (a vertical distance between a point on the aspherical surface that is distanced from the optic axis by R and a surface tangent to a vertex of the aspherical surface on the optic axis).

For convenience, the aspherical surface of each lens adopts the aspherical surface specified by the above-mentioned equation (1). However, the present invention is not limited to the aspherical polynomial form represented by the equation (1).

Table 3 and Table 4 show the design data of the inflection point and the stagnation point of each lens in the camera optical lens 10 according to Embodiment 1. Herein, P1R1 and P1R2 respectively represent the object side surface and the image side surface of the first lens L1; P2R1 and P2R2 respectively represent the object side surface and the image side surface of the second lens L2; P3R1 and P3R2 respectively represent the object side surface and the image side surface of the third lens L3; P4R1 and P4R2 respectively represent the object side surface and the image side surface of the fourth lens L4; P5R1 and P5R2 respectively represent the object side surface and the image side surface of the fifth lens L5; P6R1 and P6R2 respectively represent the object side and the image side surface of the sixth lens L6; and P7R1 and P7R2 respectively represent the object side surface and the image side surface of the seventh lens L7. The corresponding data in the "inflection point position" column is a vertical distance from the inflection point set on a surface of each lens to the optic axis of the camera optical lens 10. The corresponding data in the "stagnation point position" column is a vertical distance from the stagnation point set on a surface of each lens to the optic axis of the camera optical lens 10.

TABLE 3

| | Number of inflection points | Inflection point position 1 | Inflection point position 2 | Inflection point position 3 | Inflection point position 4 |
|---|---|---|---|---|---|
| P1R1 | 1 | 1.705 | / | / | / |
| P1R2 | 1 | 1.355 | / | / | / |
| P2R1 | 0 | / | / | / | / |
| P2R2 | 0 | / | / | / | / |
| P3R1 | 1 | 0.645 | / | / | / |
| P3R2 | 1 | 0.425 | / | / | / |
| P4R1 | 1 | 0.125 | / | / | / |
| P4R2 | 2 | 0.335 | 1.745 | / | / |
| P5R1 | 2 | 0.295 | 1.975 | / | / |
| P5R2 | 3 | 0.135 | 1.975 | 2.275 | / |
| P6R1 | 2 | 0.855 | 2.495 | / | / |
| P6R2 | 3 | 1.025 | 3.565 | 3.895 | / |
| P7R1 | 3 | 1.685 | 3.615 | 4.035 | / |
| P7R2 | 4 | 0.555 | 3.675 | 4.065 | 4.435 |

TABLE 4

| | Number of stagnation points | Stagnation point position 1 |
|---|---|---|
| P1R1 | 0 | / |
| P1R2 | 0 | / |
| P2R1 | 0 | / |
| P2R2 | 0 | / |
| P3R1 | 1 | 1.005 |
| P3R2 | 1 | 0.705 |
| P4R1 | 1 | 0.215 |
| P4R2 | 1 | 0.585 |
| P5R1 | 1 | 0.525 |
| P5R2 | 1 | 0.225 |
| P6R1 | 1 | 1.465 |
| P6R2 | 1 | 1.625 |
| P7R1 | 1 | 4.415 |
| P7R2 | 1 | 1.095 |

Figure 2:
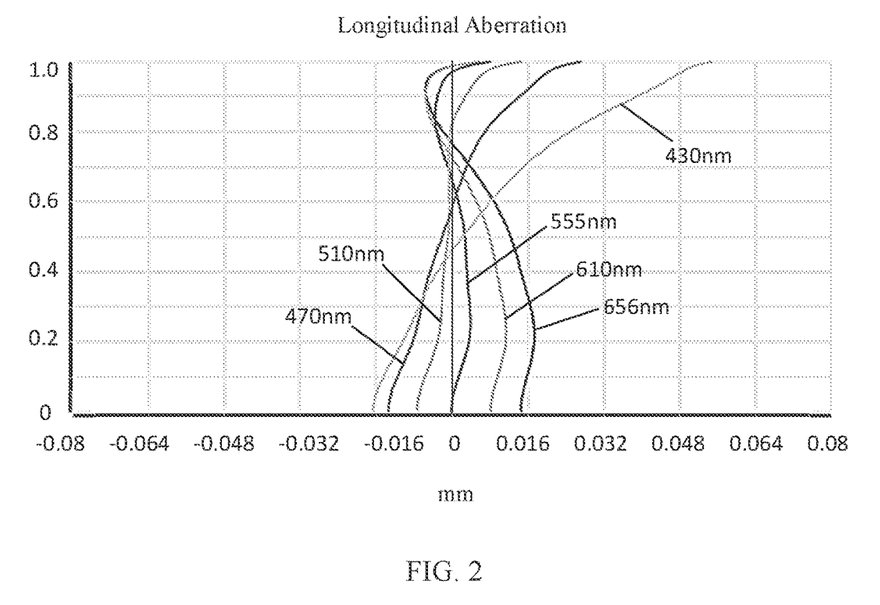
FIG. 2 is a schematic diagram of longitudinal aberration of the camera optical lens shown in FIG. 1.
Figure 3:
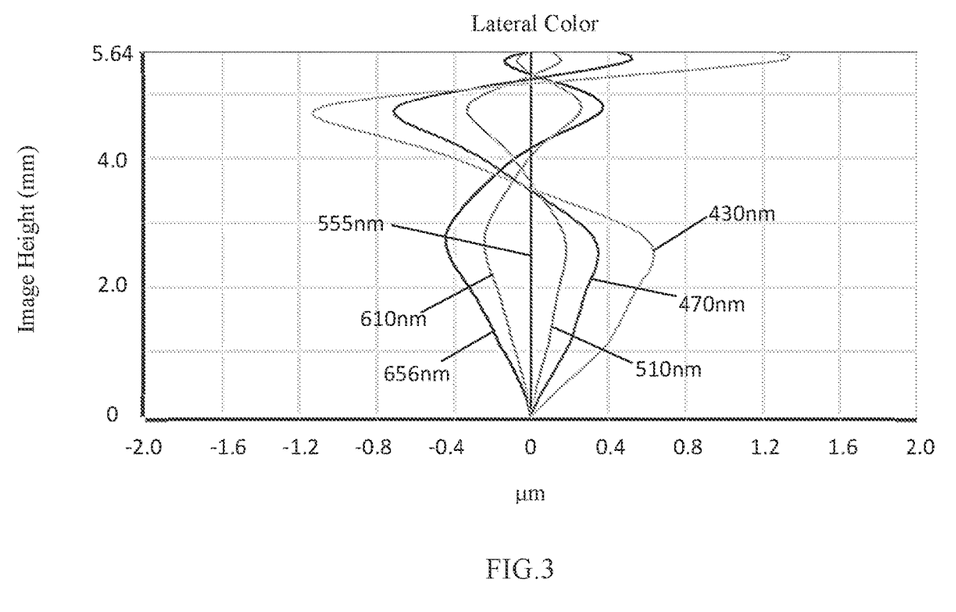
FIG. 3 is a schematic diagram of lateral color of the camera optical lens shown in FIG. 1.
Figure 4:
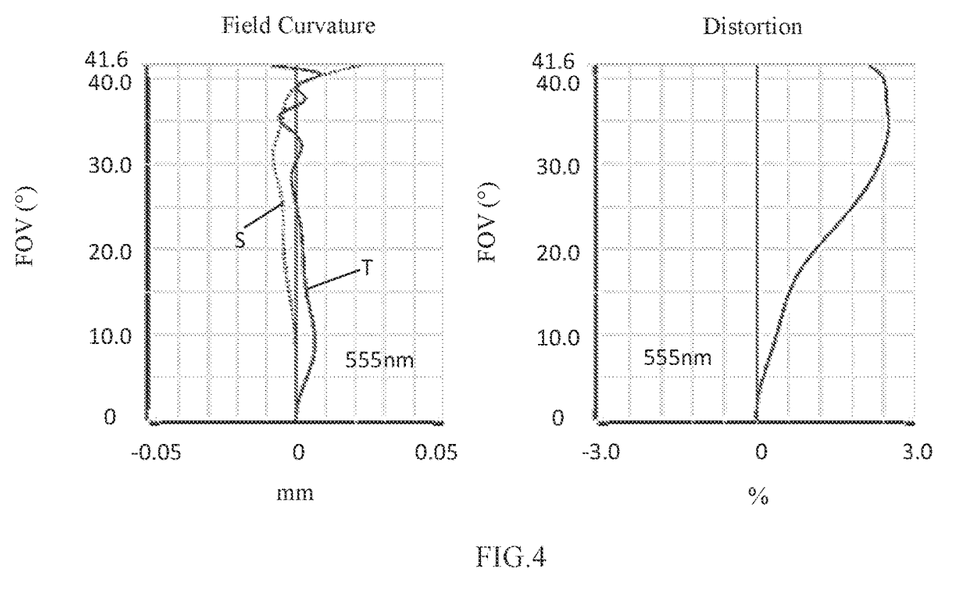
FIG. 4 is a schematic diagram of field curvature and distortion of the camera optical lens shown in FIG. 1.

FIG. 2 and FIG. 3 respectively show schematic diagrams of longitudinal aberration and lateral color of light having wavelengths of 656 nm, 610 nm, 555 nm, 510 nm, 470 nm, and 430 mm after passing through the camera optical lens 10 according to Embodiment 1. FIG. 4 shows a schematic diagram of field curvature and distortion of light having a wavelength of 555 nm after passing through the camera optical lens 10 according to Embodiment 1. In FIG. 4, the field curvature S is the field curvature in a sagittal direction, and the field curvature T is the field curvature in a meridian direction.

In addition, the values corresponding to the various parameters and the parameters specified in the respective conditions in each of Embodiments 1, 2, and 3 are listed in Table 13.

As shown in Table 13, Embodiment 1 satisfies the respective conditions.

In this embodiment, an entrance pupil diameter ENPD of the camera optical lens is 3.46 mm, the full field of view image height IH is 5.644 mm, and the FOV in a diagonal direction is 83.20°, so that the camera optical lens 10 can meet the design requirements of a large aperture, a wide angle and ultra-thinness. The on-axis and off-axis color aberrations are fully corrected, and the camera optical lens 10 has excellent optical performance.

Embodiment 2

Embodiment 2 is basically the same as Embodiment 1, the symbols have the same representation as Embodiment 1, and only the difference from Embodiment 1 will be described in the following.

Figure 5:
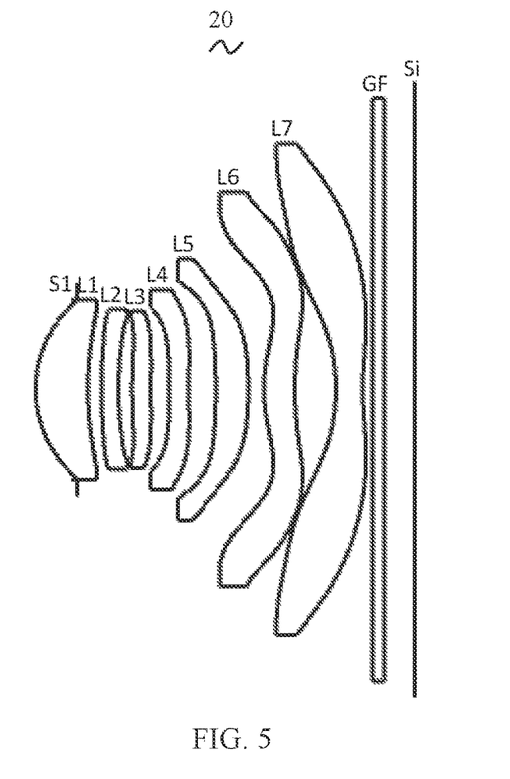
FIG. 5 is a schematic structural diagram of a camera optical lens according to Embodiment 2.

In this embodiment, the object side surface of the fifth lens L5 is a concave surface at a paraxial position, and the image side surface of the fifth lens L5 is a convex surface at a paraxial position.

Table 5 and Table 6 show the design data of the camera optical lens 20 according to Embodiment 2 of the present invention.

TABLE 5

|  | R | d |  | nd |  | vd |
|---|---|---|---|---|---|---|
| S1 | ∞ | d0= | −0.777 |  |  |  |
| R1 | 2.204 | d1= | 0.982 | nd1 | 1.4970 v1 | 81.60 |
| R2 | 6.142 | d2= | 0.251 |  |  |  |
| R3 | 9.096 | d3= | 0.320 | nd2 | 1.6800 v2 | 18.14 |
| R4 | 6.320 | d4= | 0.248 |  |  |  |
| R5 | 10.720 | d5= | 0.350 | nd3 | 1.5444 v3 | 55.82 |
| R6 | 48.335 | d6= | 0.340 |  |  |  |
| R7 | 611254711 | d7= | 0.375 | nd4 | 1.6700 v4 | 19.39 |
| R8 | 16.015 | d8= | 0.504 |  |  |  |
| R9 | −17.185 | d9= | 0.590 | nd5 | 1.5661 v5 | 37.71 |
| R10 | −12.649 | d10= | 0.296 |  |  |  |
| R11 | 2.823 | d11= | 0.580 | nd6 | 1.5346 v6 | 55.69 |
| R12 | 8.040 | d12= | 0.770 |  |  |  |
| R13 | −4.154 | d13= | 0.500 | nd7 | 1.5346 v7 | 55.69 |
| R14 | 5.367 | d14= | 0.188 |  |  |  |
| R15 | ∞ | d15= | 0.210 | ndg | 1.5168 vg | 64.17 |
| R16 | ∞ | d16= | 0.582 |  |  |  |

Table 6 shows the aspherical surface data of the lenses in the camera optical lens 20 according to Embodiment 2 of the present invention.

TABLE 6

|  | Cone coefficient | Aspherical coefficient | | | | |
|---|---|---|---|---|---|---|
|  | k | A4 | A6 | A8 | A10 | A12 |
| R1 | −2.1615E−01 | 3.0152E−03 | 1.1606E−04 | 9.2310E−04 | −5.9943E−04 | 1.5309E−04 |
| R2 | −2.6271E+01 | 9.9428E−03 | −2.9256E−03 | −2.6115E−04 | 9.1517E−04 | −5.9601E−04 |
| R3 | 2.7633E+01 | −2.0637E−02 | 5.5133E−03 | −1.1443E−03 | 6.7850E−04 | 1.5748E−04 |
| R4 | −3.4889E+01 | 2.7427E−03 | 4.3244E−04 | 1.8931E−03 | −1.8957E−03 | 5.5642E−03 |
| R5 | −9.9900E+01 | −7.3403E−03 | −6.0271E−03 | −5.8266E−03 | 6.1727E−03 | −5.0991E−03 |
| R6 | −9.9990E+01 | −1.8461E−02 | −8.9750E−03 | 2.3132E−02 | −5.3287E−02 | 6.4341E−02 |
| R7 | 9.9760E+01 | −5.6335E−02 | 1.1453E−02 | −3.0017E−02 | 5.1953E−02 | −5.9123E−02 |
| R8 | −8.8715E+01 | −4.1043E−02 | 3.6217E−03 | −1.1353E−03 | −9.5565E−04 | 1.6116E−03 |
| R9 | −9.9990E+01 | −2.0138E−02 | 2.2223E−03 | −1.0577E−03 | −2.2226E−03 | 2.0650E−03 |
| R10 | −7.4654E+01 | −7.9998E−02 | 3.4089E−02 | −1.5548E−02 | 6.3061E−03 | −2.2210E−03 |
| R11 | −9.9204E+00 | 5.1133E−04 | −1.5413E−02 | 4.2537E−03 | −9.7840E−04 | 1.8441E−04 |
| R12 | 2.7834E+00 | 3.2962E−02 | −2.7045E−02 | 7.6668E−03 | −1.3889E−03 | 1.7064E−04 |
| R13 | −5.2133E−01 | −3.3520E−02 | 1.2774E−02 | −2.0735E−03 | 2.2523E−04 | −1.8230E−05 |
| R14 | −3.7127E+01 | −2.5755E−02 | 5.4879E−03 | −9.1256E−04 | 1.1699E−04 | −1.0756E−05 |

|  | Cone coefficient | Aspherical coefficient | | | |
|---|---|---|---|---|---|
|  | k | A14 | A16 | A18 | A20 |
| R1 | −2.1615E−01 | 9.9193E−05 | −9.7079E−05 | 3.1398E−05 | −4.0047E−06 |
| R2 | −2.6271E+01 | 5.5370E−05 | 8.7215E−05 | −3.6659E−05 | 4.2333E−06 |
| R3 | 2.7633E+01 | −3.7481E−04 | 2.2583E−04 | −5.2615E−05 | 3.5529E−06 |
| R4 | −3.4889E+01 | −6.8426E−03 | 4.5734E−03 | −1.5713E−03 | 2.2968E−04 |
| R5 | −9.9900E+01 | 2.6173E−03 | −8.6721E−04 | 2.2302E−04 | −2.7757E−05 |
| R6 | −9.9990E+01 | −4.6990E−02 | 2.0487E−02 | −4.8457E−03 | 4.7671E−04 |
| R7 | 9.9760E+01 | 4.1875E−02 | −1.8078E−02 | 4.3930E−03 | −4.6278E−04 |
| R8 | −8.8715E+01 | −1.0873E−03 | 4.1514E−04 | −8.4323E−05 | 7.0608E−06 |
| R9 | −9.9990E+01 | −1.0347E−03 | 3.1933E−04 | −5.4616E−05 | 3.8861E−06 |
| R10 | −7.4654E+01 | 5.6413E−04 | −8.5800E−05 | 6.8396E−06 | −2.2008E−07 |
| R11 | −9.9204E+00 | −2.1404E−05 | 1.3822E−06 | −4.5104E−08 | 5.6222E−10 |
| R12 | 2.7834E+00 | −1.3631E−05 | 6.4951E−07 | −1.5899E−08 | 1.3868E−10 |
| R13 | −5.2133E−01 | 1.0745E−06 | −4.2197E−08 | 9.6564E−10 | −9.6427E−12 |
| R14 | −3.7127E+01 | 6.5792E−07 | −2.5060E−08 | 5.3578E−10 | −4.9040E−12 |

Table 7 and Table 8 show the design data of the inflection point and stagnation point of each lens in the camera optical lens 20 according to Embodiment 2 of the present invention.

TABLE 7

| | Number of inflection points | Inflection point position 1 | Inflection point position 2 | Inflection point position 3 | Inflection point position 4 |
|---|---|---|---|---|---|
| P1R1 | 1 | 1.675 | / | / | / |
| PIR2 | 1 | 1.325 | / | / | / |
| P2R1 | 0 | / | / | / | / |
| P2R2 | 0 | / | / | / | / |
| P3R1 | 1 | 0.605 | / | / | / |
| P3R2 | 1 | 0.295 | / | / | / |
| P4R1 | 0 | / | / | / | / |
| P4R2 | 2 | 0.355 | 1.765 | / | / |
| P5R1 | 1 | 1.995 | / | / | / |
| P5R2 | 2 | 1.935 | 2.265 | / | / |
| P6R1 | 2 | 0.835 | 2.425 | / | / |
| P6R2 | 2 | 1.065 | 3.365 | / | / |
| P7R1 | 4 | 1.715 | 3.295 | 3.445 | 4.395 |
| P7R2 | 3 | 0.635 | 4.365 | 4.615 | / |

TABLE 8

| | Number of stagnation points | Stagnation point position 1 |
|---|---|---|
| P1R1 | 0 | / |
| P1R2 | 0 | / |
| P2R1 | 0 | / |
| P2R2 | 0 | / |
| P3R1 | 1 | 0.945 |
| P3R2 | 1 | 0.505 |
| P4R1 | 0 | / |
| P4R2 | 1 | 0.615 |
| P5R1 | 0 | / |
| P5R2 | 0 | / |
| P6R1 | 1 | 1.415 |
| P6R2 | 1 | 1.675 |
| P7R1 | 0 | / |
| P7R2 | 1 | 1.285 |

Figure 6:
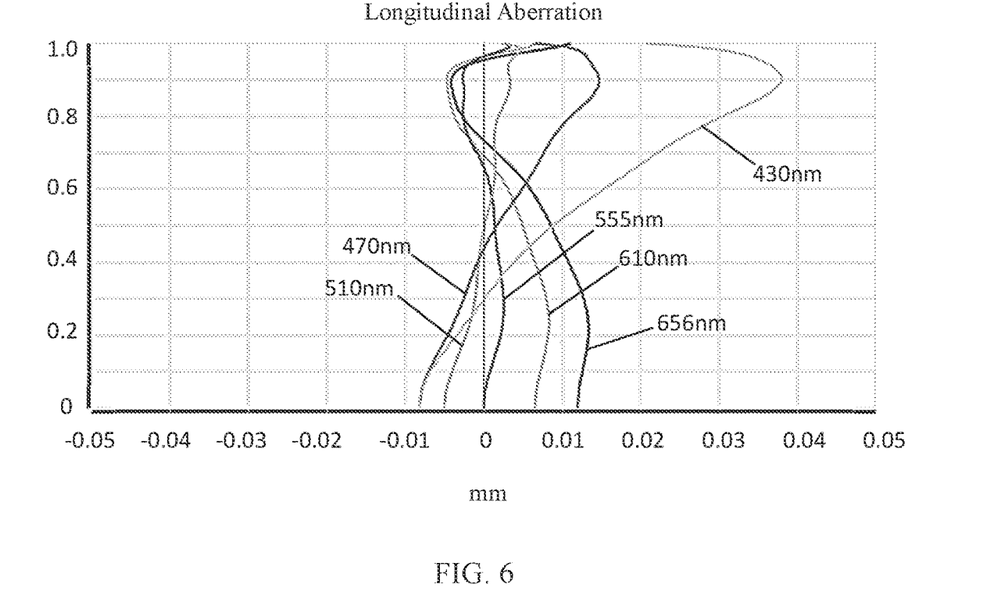
FIG. 6 is a schematic diagram of longitudinal aberration of the camera optical lens shown in FIG. 5.
Figure 7:
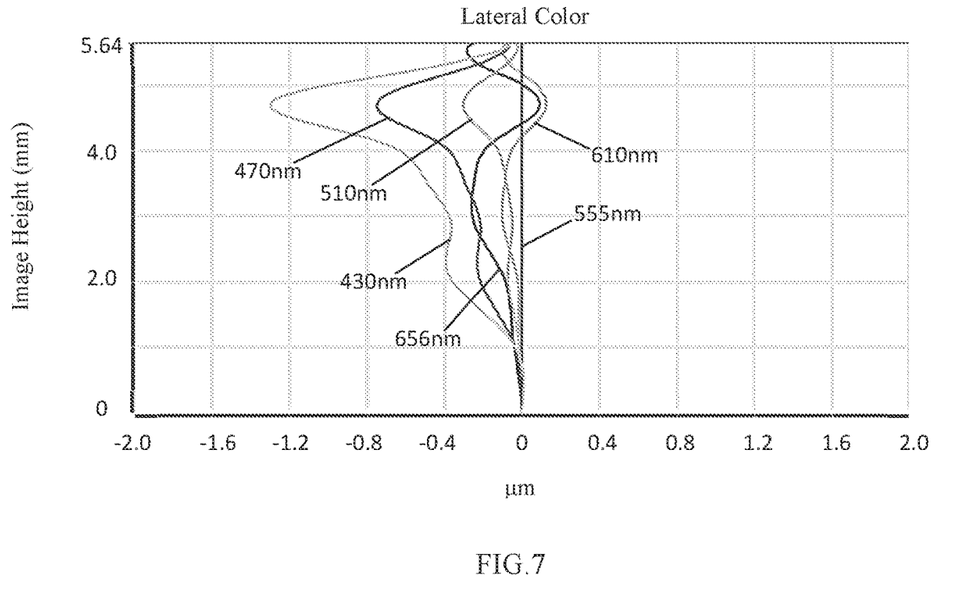
FIG. 7 is a schematic diagram of lateral color of the camera optical lens shown in FIG. 5.
Figure 8:
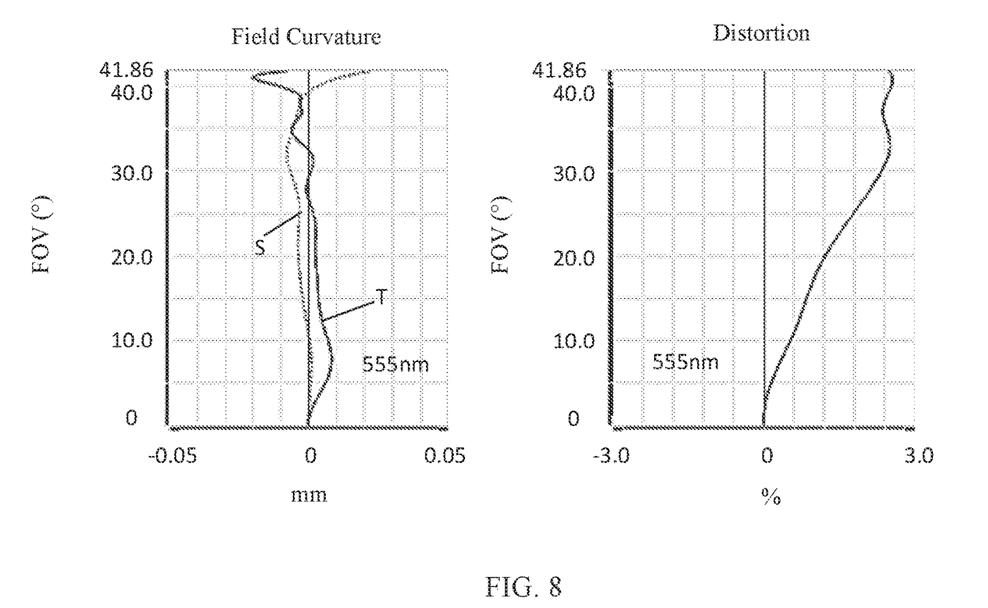
FIG. 8 is a schematic diagram of field curvature and distortion of the camera optical lens shown in FIG. 5.

FIG. 6 and FIG. 7 respectively show schematic diagrams of longitudinal aberration and lateral color of light having wavelengths of 656 nm, 610 nm, 555 nm, 510 nm, 470 nm, and 430 mm after passing through the camera optical lens 20 according to Embodiment 2. FIG. 8 shows a schematic diagram of field curvature and distortion of light having a wavelength of 555 nm after passing through the camera optical lens 20 according to Embodiment 2.

As shown in Table 13, Embodiment 2 satisfies the respective conditions.

In this embodiment, an entrance pupil diameter ENPD of the camera optical lens is 3.415 mm, the full field of view image height IH is 5.644 mm, and the FOV in a diagonal direction is 83.71°, so that the camera optical lens 20 can meet the design requirements of a large aperture, a wide angle and ultra-thinness. The on-axis and off-axis color aberrations are fully corrected, and the camera optical lens 20 has excellent optical performance.

Embodiment 3

Embodiment 3 is basically the same as Embodiment 1, the symbols have the same representation as Embodiment 1, and only the difference from Embodiment 1 will be described in the following.

Figure 9:
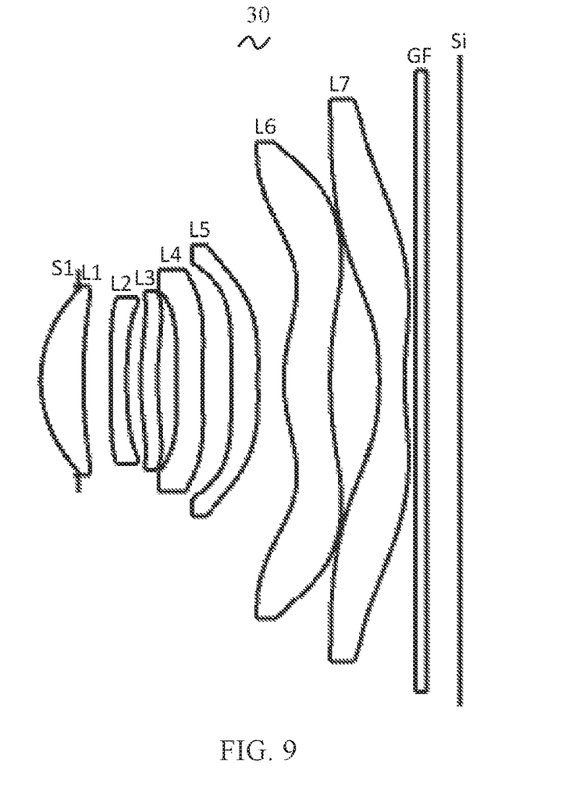
FIG. 9 is a schematic structural diagram of a camera optical lens according to Embodiment 3.

In this embodiment, the fifth lens L5 has a negative refractive power.

Table 9 and Table 10 shows the design data of the camera optical lens 30 according to Embodiment 3 of the present invention.

TABLE 9

| | R | d | | nd | | vd |
|---|---|---|---|---|---|---|
| S1 | ∞ | d0= | −0.663 | | | |
| R1 | 2.349 | d1= | 0.743 | nd1 | 1.5267 v1 | 76.61 |
| R2 | 9.075 | d2= | 0.480 | | | |
| R3 | 32.907 | d3= | 0.287 | nd2 | 1.6153 v2 | 25.94 |
| R4 | 7.521 | d4= | 0.251 | | | |
| R5 | 5.144 | d5= | 0.300 | nd3 | 1.5444 v3 | 55.82 |
| R6 | 5.905 | d6= | 0.331 | | | |
| R7 | 40.449 | d7= | 0.460 | nd4 | 1.6700 v4 | 19.39 |
| R8 | 13.438 | d8= | 0.512 | | | |
| R9 | 30.039 | d9= | 0.473 | nd5 | 1.5661 v5 | 37.71 |
| R10 | 26.196 | d10= | 0.446 | | | |
| R11 | 2.779 | d11= | 0.826 | nd6 | 1.5346 v6 | 55.69 |
| R12 | 10.101 | d12= | 0.870 | | | |
| R13 | −6.064 | d13= | 0.442 | nd7 | 1.5346 v7 | 55.69 |
| R14 | 4.601 | d14= | 0.188 | | | |
| R15 | ∞ | d15= | 0.210 | ndg | 1.5168 vg | 64.17 |
| R16 | ∞ | d16= | 0.582 | | | |

Table 10 shows the aspherical surface data of the lenses in the camera optical lens 30 according to Embodiment 3 of the present invention.

TABLE 10

| | Cone coefficient | Aspherical coefficient | | | | |
|---|---|---|---|---|---|---|
| | k | A4 | A6 | A8 | A10 | A12 |
| R1 | −2.8601E−01 | 2.2940E−03 | 4.2299E−03 | −9.8598E−03 | 1.5184E−02 | −1.4173E−02 |
| R2 | −4.1631E+01 | 5.8841E−03 | −1.7091E−03 | 5.2970E−04 | −6.3693E−04 | 4.3426E−04 |
| R3 | 9.9000E+01 | 2.1792E−03 | 7.1541E−03 | −4.5202E−03 | 2.6019E−03 | 3.6365E−04 |
| R4 | −1.0584E+01 | 2.8277E−03 | 1.5333E−02 | −1.2265E−02 | 7.9674E−03 | 1.4561E−03 |
| R5 | −2.6939E+01 | −3.6559E−03 | 2.9531E−05 | −7.1941E−03 | 6.6332E−03 | −4.8199E−03 |
| R6 | −2.1024E+00 | −2.9263E−02 | 1.8501E−02 | −3.0220E−02 | 3.4853E−02 | −2.9985E−02 |
| R7 | −9.9900E+01 | −4.8763E−02 | 1.4738E−02 | −2.1726E−02 | 2.3880E−02 | −E8792E−02 |
| R8 | −3.1775E+01 | −4.1977E−02 | 1.6250E−02 | −1.6040E−02 | 1.1999E−02 | −6.3138E−03 |
| R9 | −4.0480E+01 | −5.8118E−02 | 3.3538E−02 | −2.0514E−02 | 6.8293E−03 | −6.1539E−04 |
| R10 | −8.4409E+01 | −1.0458E−01 | 5.4195E−02 | −2.8596E−02 | 1.1773E−02 | −3.4933E−03 |
| R11 | −7.3930E+00 | −1.0656E−02 | −1.2440E−03 | −7.3661E−04 | 3.0640E−04 | −4.5093E−05 |
| R12 | 3.2571E+00 | 2.3629E−02 | −1.2595E−02 | 2.6211E−03 | −3.3858E−04 | 2.8597E−05 |
| R13 | 1.3859E−01 | −3.7203E−02 | 1.3844E−02 | −2.3643E−03 | 2.5311E−04 | −1.7971E−05 |
| R14 | −2.2898E+01 | −2.8976E−02 | 6.6387E−03 | −1.1383E−03 | 1.3298E−04 | −1.0008E−05 |

TABLE 10-continued

| | Cone coefficient | Aspherical coefficient | | | |
|---|---|---|---|---|---|
| | k | A14 | A16 | A18 | A20 |
| R1 | −2.8601E−01 | 8.1206E−03 | −2.8017E−03 | 5.3397E−04 | −4.3483E−05 |
| R2 | −4.1631E+01 | −1.2094E−04 | −2.2419E−05 | 2.0051E−05 | −3.3708E−06 |
| R3 | 9.9000E+01 | −1.3700E−03 | 8.8075E−04 | −2.5573E−04 | 2.9610E−05 |
| R4 | −1.0584E+01 | −6.4735E−03 | 5.0040E−03 | −1.7388E−03 | 2.4113E−04 |
| R5 | −2.6939E+01 | 2.2064E−03 | −5.8204E−04 | 7.7656E−05 | −3.6401E−06 |
| R6 | −2.1024E+00 | 1.6826E−02 | −5.8895E−03 | 1.1543E−03 | −9.6172E−05 |
| R7 | −9.9900E+01 | 9.6186E−03 | −3.0582E−03 | 5.1940E−04 | −3.2802E−05 |
| R8 | −3.1775E+01 | 2.2455E−03 | −5.1498E−04 | 6.8881E−05 | −4.0019E−06 |
| R9 | −4.0480E+01 | −5.4445E−04 | 2.5363E−04 | −4.5957E−05 | 3.1567E−06 |
| R10 | −8.4409E+01 | 6.8347E−04 | −7.8633E−05 | 4.5485E−06 | −9.1966E−08 |
| R11 | −7.3930E+00 | 3.5395E−06 | −1.5895E−07 | 3.8697E−09 | −3.9748E−11 |
| R12 | 3.2571E+00 | −1.5566E−06 | 5.1115E−08 | −8.8207E−10 | 5.6901E−12 |
| R13 | 1.3859E−01 | 8.4162E−07 | −2.4813E−08 | 4.1423E−10 | −2.9648E−12 |
| R14 | −2.2898E+00 | 4.7173E−07 | −1.3306E−08 | 2.0265E−10 | −1.2592E−12 |

Table 11 and Table 12 show the design data of the inflection point and the stagnation point of each lens in the camera optical lens 30 according to Embodiment 3 of the present invention.

TABLE 11

| | Number of inflection points | Inflection point position 1 | Inflection point position 2 | Inflection point position 3 | Inflection point position 4 |
|---|---|---|---|---|---|
| P1R1 | 1 | 1.635 | / | / | / |
| P1R2 | 1 | 1.345 | / | / | / |
| P2R1 | 0 | / | / | / | / |
| P2R2 | 0 | / | / | / | / |
| P3R1 | 1 | 0.835 | / | / | / |
| P3R2 | 1 | 0.775 | / | / | / |
| P4R1 | 1 | 0.215 | / | / | / |
| P4R2 | 2 | 0.405 | 1.795 | / | / |
| P5R1 | 2 | 0.235 | 2.045 | / | / |
| P5R2 | 3 | 0.185 | 2.015 | 2.275 | / |
| P6R1 | 2 | 0.945 | 2.735 | / | / |
| P6R2 | 2 | 1.335 | 4.005 | / | / |
| P7R1 | 3 | 1.735 | 4.365 | 4.735 | / |
| P7R2 | 4 | 0.675 | 3.665 | 4.555 | 4.935 |

TABLE 12

| | Number of stagnation points | Stagnation point position 1 | Stagnation point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 1.295 | / |
| P3R2 | 1 | 1.195 | / |
| P4R1 | 1 | 0.365 | / |
| P4R2 | 1 | 0.715 | / |
| P5R1 | 1 | 0.405 | / |
| P5R2 | 1 | 0.315 | / |
| P6R1 | 2 | 1.695 | 4.035 |
| P6R2 | 1 | 2.165 | / |
| P7R1 | 1 | 4.865 | / |
| P7R2 | 1 | 1.395 | / |

Figure 10:
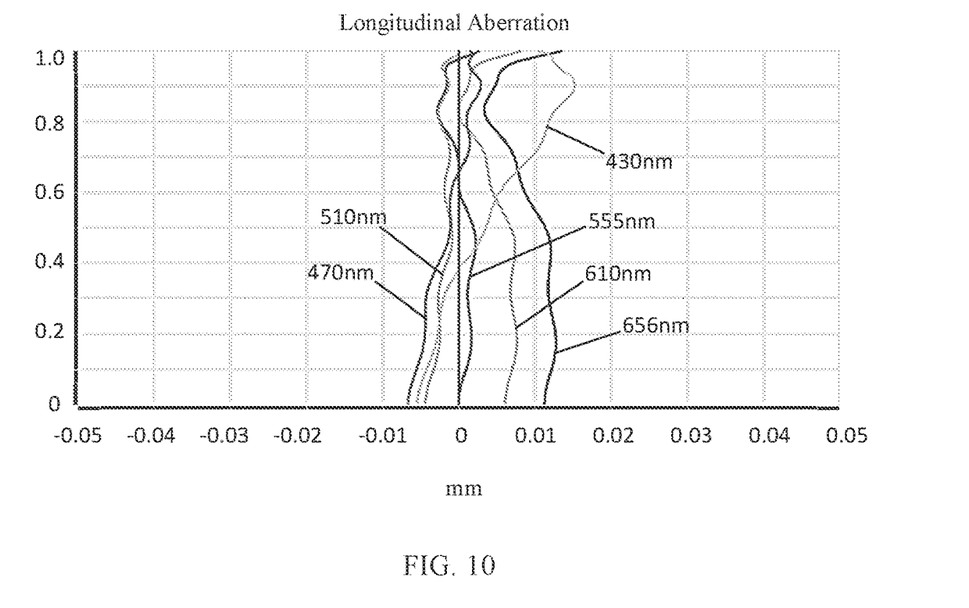
FIG. 10 is a schematic diagram of longitudinal aberration of the camera optical lens shown in FIG. 9.
Figure 11:
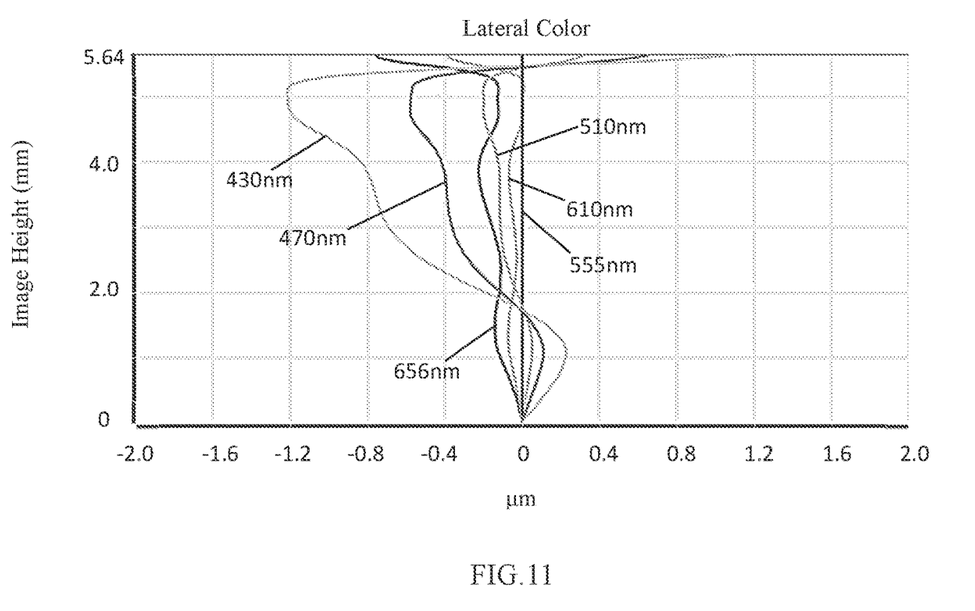
FIG. 11 is a schematic diagram of lateral color of the camera optical lens shown in FIG. 9.
Figure 12:
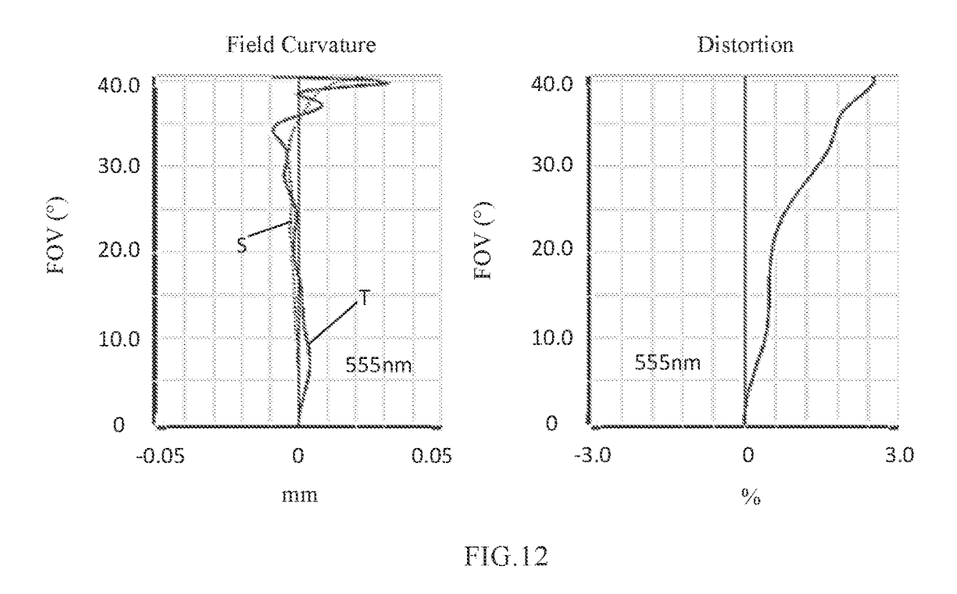
FIG. 12 is a schematic diagram of field curvature and distortion of the camera optical lens shown in FIG. 9.

FIG. 10 and FIG. 11 respectively show schematic diagrams of longitudinal aberration and lateral color of light having wavelengths of 656 nm, 610 nm, 555 nm, 510 nm, 470 nm, and 430 mm after passing through the camera optical lens 30 according to Embodiment 3. FIG. 12 shows a schematic diagram of field curvature and distortion of light having a wavelength of 555 nm after passing through the camera optical lens 30 according to Embodiment 3.

The values corresponding to the various parameters and the parameters specified in the conditions in Embodiment 3 are listed in Table 13. It can be seen that the imaging optical system according to this embodiment satisfies the above-mentioned condition.

In this embodiment, an entrance pupil diameter ENPD of the camera optical lens is 3.392 mm, the full field of view image height IH is 5.644 mm, and the FOV in a diagonal direction is 80.00°, so that the camera optical lens 30 can meet the design requirements of a large aperture, a wide angle and ultra-thinness. The on-axis and off-axis color aberrations are fully corrected, and the camera optical lens 30 has excellent optical performance.

TABLE 13

| Parameters and conditions | Embodiment 1 | Embodiment 2 | Embodiment 3 |
|---|---|---|---|
| v1/v2 | 3.95 | 4.50 | 2.95 |
| f3/f | 6.16 | 4.09 | 9.95 |
| d1/d2 | 2.73 | 3.91 | 1.55 |
| R7/R8 | 6.30 | 38167637.26 | 3.01 |
| f | 6.227 | 6.146 | 6.444 |
| f1 | 6.189 | 6.372 | 5.783 |
| f2 | −26.468 | −31.643 | −15.804 |
| f3 | 38.335 | 25.139 | 64.116 |
| f4 | −28.371 | −23.685 | −29.966 |
| f5 | 67.589 | 80.447 | −376.781 |
| f6 | 8.173 | 7.807 | 6.877 |
| f7 | −4.516 | −4.287 | −4.808 |
| f12 | 7.406 | 7.435 | 8.043 |
| FNO | 1.80 | 1.80 | 1.90 |
| TTL | 7.084 | 7.086 | 7.401 |
| IH | 5.644 | 5.644 | 5.644 |
| FOV | 83.20 | 83.71 | 80.00 |

It should be understood by those skilled in the art that the above embodiments are merely some specific embodiments of the present invention, and various changes in form and details may be made without departing from the scope of the present invention.

What is claimed is:

1. A camera optical lens, comprising, from an object side to an image side:
   a first lens having a positive refractive power;
   a second lens having a negative refractive power;
   a third lens having a positive refractive power;
   a fourth lens having a negative refractive power;
   a fifth lens having a refractive power;
   a sixth lens having a positive refractive power; and
   a seventh lens having a negative refractive power, wherein the camera optical lens satisfies following conditions:

$2.90 \leq v1/v2 \leq 4.50$;

$4.00 \leq f3/f \leq 10.00$;

$1.50 \leq d1/d2 \leq 4.00$; and $3.00 \leq R7/R8$, where f denotes a focal length of the camera optical lens, f3 denotes a focal length of the third lens, v1 denotes an abbe number of the first lens, v2 denotes an abbe number of the second lens, R7 denotes a curvature radius of an object side surface of the fourth lens, R8 denotes a curvature radius of an image side surface of the fourth lens, d1 denotes an on-axis thickness of the first lens, and d2 denotes an on-axis distance from an image side surface of the first lens to an object side surface of the second lens.

2. The camera optical lens as described in claim 1, further satisfying a following condition:

$-15.00 \leq (R5+R6)/(R5-R6) \leq -1.50$, where R5 denotes a curvature radius of an object side surface of the third lens, and R6 denotes a curvature radius of an image side surface of the third lens.

3. The camera optical lens as described in claim 1, further satisfying following conditions:

$0.45 \leq f1/f \leq 1.56$;

$-4.24 \leq (R1+R2)/(R1-R2) \leq -1.13$; and $0.05 \leq d1/TTL \leq 0.21$, where f1 denotes a focal length of the first lens, R1 denotes a curvature radius of an object side surface of the first lens, R2 denotes a curvature radius of the image side surface of the first lens, and TTL denotes a total optical length from the object side surface of the first lens to an image plane of the camera optical lens along an optic axis.

4. The camera optical lens as described in claim 1, further satisfying following conditions:

$-10.30 \leq f2/f \leq -1.64$;

$0.80 \leq (R3+R4)/(R3-R4) \leq 8.33$; and $0.02 \leq d3/TTL \leq 0.08$, where f2 denotes a focal length of the second lens, R3 denotes a curvature radius of the object side surface of the second lens, R4 denotes a curvature radius of an image side surface of the second lens, d3 denotes an on-axis thickness of the second lens, and TTL denotes a total optical length from an object side surface of the first lens to an image plane of the camera optical lens along an optic axis.

5. The camera optical lens as described in claim 1, further satisfying a following condition:

$0.02 \leq d5/TTL \leq 0.08$, where d5 denotes an on-axis thickness of the third lens, and TTL denotes a total optical length from an object side surface of the first lens to an image plane of the camera optical lens along an optic axis.

6. The camera optical lens as described in claim 1, further satisfying following conditions:

$-9.30 \leq f4/f \leq -2.57$;

$0.50 \leq (R7+R8)/(R7-R8) \leq 2.99$; and $0.03 \leq d7/TTL \leq 0.09$, where f4 denotes a focal length of the fourth lens, d7 denotes an on-axis thickness of the fourth lens, and TTL denotes a total optical length from an object side surface of the first lens to an image plane of the camera optical lens along an optic axis.

7. The camera optical lens as described in claim 1, further satisfying following conditions:

$-116.94 \leq f5/f \leq 19.63$;

$-4.32 \leq (R9+R10)/(R9-R10) \leq 21.95$; and $0.03 \leq d9/TTL \leq 0.12$, where f5 denotes a focal length of the fifth lens, R9 denotes a curvature radius of an object side surface of the fifth lens, R10 denotes a curvature radius of an image side surface of the fifth lens, d9 denotes an on-axis thickness of the fifth lens, and TTL denotes a total optical length from an object side surface of the first lens to an image plane of the camera optical lens along an optic axis.

8. The camera optical lens as described in claim 1, further satisfying following conditions:

$0.53 \leq f6/f \leq 1.97$;

$-4.32 \leq (R11+R12)/(R11-R12) \leq -1.17$; and $0.04 \leq d11/TTL \leq 0.17$, where f6 denotes a focal length of the sixth lens, R11 denotes a curvature radius of an object side surface of the sixth lens, R12 denotes a curvature radius of an image side surface of the sixth lens, d11 denotes an on-axis thickness of the sixth lens, and TTL denotes a total optical length from an object side surface of the first lens to an image plane of the camera optical lens along an optic axis.

9. The camera optical lens as described in claim 1, further satisfying following conditions:

$-1.49 \leq f7/f \leq -0.47$;

$-0.61 \leq (R13+R14)/(R13-R14) \leq 0.21$; and $0.03 \leq d13/TTL \leq 0.11$, where f7 denotes a focal length of the seventh lens, R13 denotes a curvature radius of an object side surface of the seventh lens, R14 denotes a curvature radius of an image side surface of the seventh lens, d13 denotes an on-axis thickness of the seventh lens, and TTL denotes a total optical length from an object side surface of the first lens to an image plane of the camera optical lens along an optic axis.

10. The camera optical lens as described in claim 1, wherein the first lens is made of a glass material.

* * * * *